United States Patent [19]

Miller

[11] Patent Number: 5,522,238
[45] Date of Patent: Jun. 4, 1996

[54] TUNNEL FREEZER

[75] Inventor: Jeremy P. Miller, Nr. Reading, Great Britain

[73] Assignee: Air Products and Chemicals, Inc., Allentown, Pa.

[21] Appl. No.: 388,703

[22] Filed: Mar. 21, 1995

[30] Foreign Application Priority Data

Feb. 15, 1994 [GB] United Kingdom .......... 9402855

[51] Int. Cl.⁶ .......................... F25D 17/02; F25D 25/04
[52] U.S. Cl. .................................. 62/374; 62/380
[58] Field of Search ........................... 62/62, 63, 374, 62/380

[56] References Cited

U.S. PATENT DOCUMENTS

| | | | |
|---|---|---|---|
| 3,376,710 | 4/1968 | Hirtensteiner | 62/380 X |
| 3,472,043 | 10/1969 | Nelson | 62/380 |
| 3,841,109 | 10/1974 | Cann | 62/380 X |
| 3,871,186 | 3/1975 | Wagner | 62/380 X |
| 3,938,350 | 2/1976 | Martin et al. | 62/380 X |
| 4,078,398 | 3/1978 | Cloudy | 62/380 |
| 4,086,784 | 5/1978 | Wagner | 62/380 X |
| 4,584,849 | 4/1986 | Cloudy et al. | 62/380 |
| 5,168,711 | 12/1992 | Moore et al. | 62/380 X |
| 5,365,752 | 11/1994 | Coffre | 62/380 X |
| 5,444,985 | 8/1995 | Lang et al. | 62/380 X |

FOREIGN PATENT DOCUMENTS

| | | |
|---|---|---|
| 0024159A2 | 2/1981 | European Pat. Off. . |
| 742472 | 12/1955 | United Kingdom . |
| 951793 | 3/1964 | United Kingdom . |
| 1494104 | 12/1977 | United Kingdom . |

*Primary Examiner*—Christopher Kilner
*Attorney, Agent, or Firm*—Robert J. Wolff

[57] ABSTRACT

A turbulence inducing fan blows cold gaseous nitrogen through ducts disposed to either side of a conveyor carrying product to be frozen through a freezing tunnel. The cold gaseous nitrogen is deflected downwardly onto product on the conveyor by a baffle having, in cross section, the form of a cusp. The cold gaseous nitrogen forms two counter-rotating vortex. The cold gaseous nitrogen travels across the product and then passes into an intake cowl primarily via inlets disposed adjacent both edges of the conveyor. The intake cowl collects the cold gaseous nitrogen which is sucked into the intake of the turbulence inducing fan. This arrangement provides excellent heat transfer to the product being frozen.

27 Claims, 5 Drawing Sheets

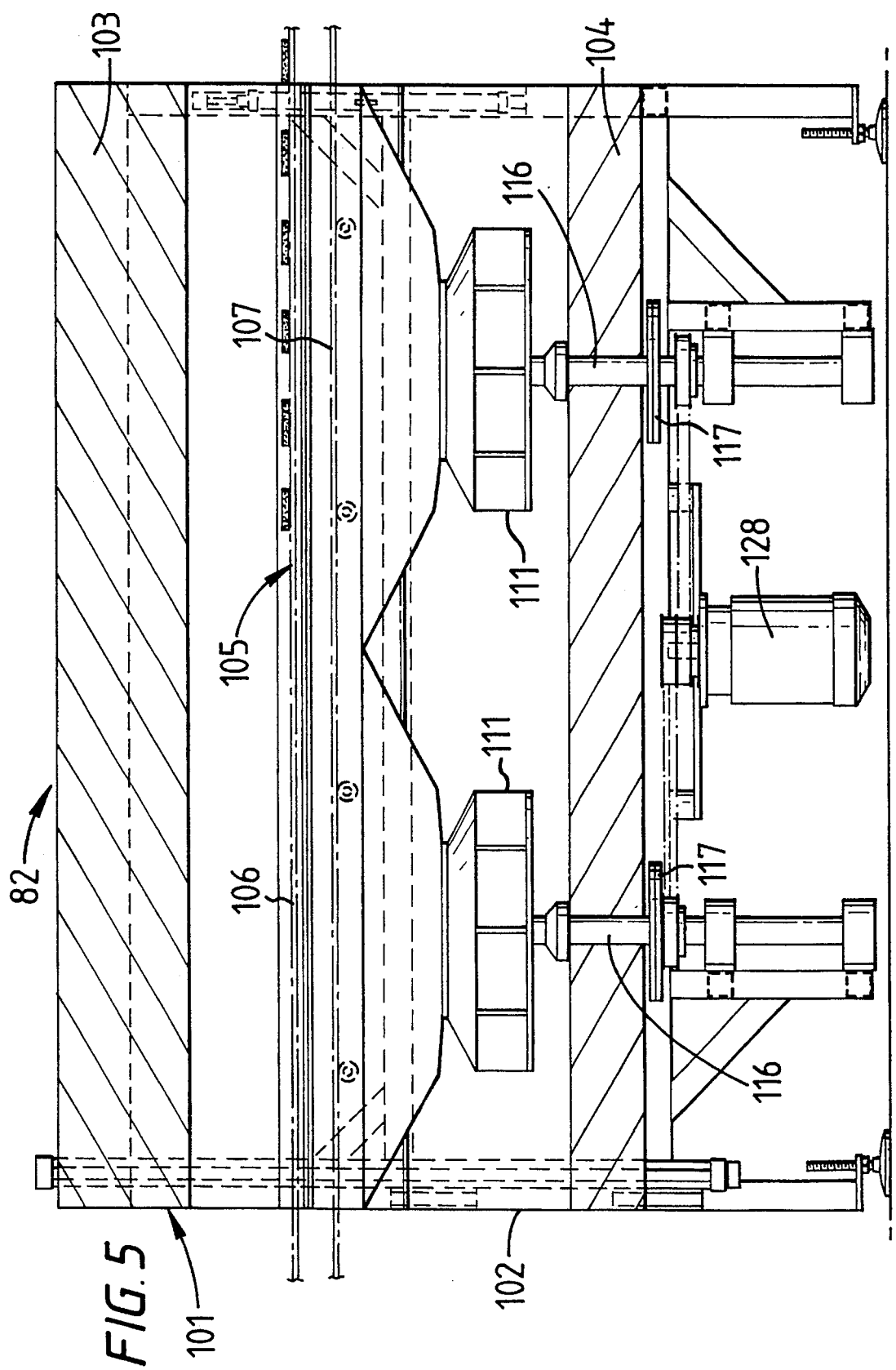

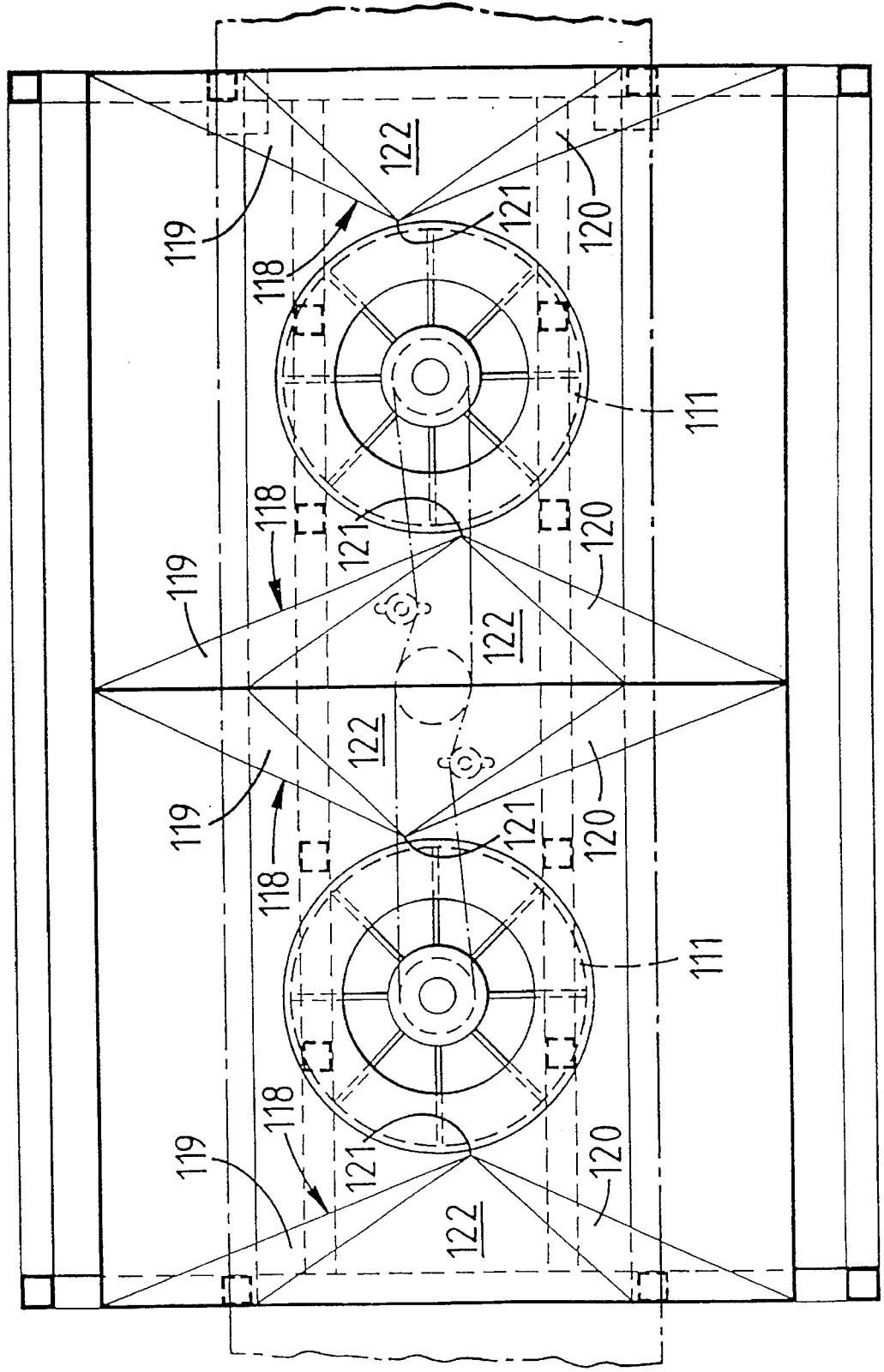

10;
TUNNEL FREEZER

FIELD OF THE INVENTION

This invention relates to tunnel freezers.

BACKGROUND OF THE INVENTION

Conventional tunnel freezers comprise an elongate tunnel. Product to be frozen, for example food is carried through the elongate tunnel on the top of an endless conveyor which typically comprises stainless steel mesh. The product is frozen by contact with cold nitrogen which is introduced as liquid through spray bars at the product outlet end of the elongate tunnel. The nitrogen passes through the elongate tunnel counter current to the flow of product and gradually evaporates. It is then exhausted to atmosphere through an exhaust duct adjacent the product inlet.

In order to maintain good heat transfer between the cold gaseous nitrogen and the product, turbulence inducing fans are provided which are situated adjacent the roof of the tunnel between the spray bars and the exhaust duct. These turbulence inducing fans typically suck cold nitrogen upwardly towards the roof and blow it out radially. Typically, heat is transferred from the product in the immediate area of the spray bars at a rate of around 120 w/m²/° K. whilst it is around 40 w/m²/° K. in the vicinity of the turbulence inducing fans.

GB-A-1 494 104 discloses a tunnel freezer comprising an elongate tunnel, a conveyor extending through said elongate tunnel and at least one turbulence inducing fan for bringing cold air into contact with product to be frozen. The fan is disposed above the conveyor and an intake cowl is positioned above the conveyor to facilitate the passage of cold air from the conveyor to the intake of the turbulence inducing fan. Ducts are provided to guide the cold air from the turbulence inducing fan, over an indirect heat-exchanger, to the space below the conveyor. The cold air passes upwardly through the conveyor and is recycled to the turbulence inducing fan. No heat-transfer rates are quoted although Applicant's experiments indicate that it is less than Applicant's existing freezers.

The aim of at least preferred embodiments of the present invention is to increase the rate of heat transfer in the vicinity of the turbulence inducing fans.

According to the present invention there is provided a tunnel freezer comprising an elongate tunnel, a conveyor extending through said elongate tunnel and at least one turbulence inducing fan for bringing cryogenic vapour into contact with product to be frozen when said tunnel freezer is in use, characterized in that said turbulence inducing fan is disposed beneath said conveyor and is provided with an intake cowl which is positioned below said conveyor to facilitate the passage of cryogenic vapour from said conveyor to the intake of said turbulence inducing fan, means to duct cryogenic vapour from said turbulence inducing fan to the space above of said conveyor, and means to promote the formation in said space of at least one vortex which will rotate about an axis which is generally parallel to the axis of said elongate tunnel.

Preferably, the intake cowl extends beyond either edge of the conveyor.

Advantageously, the means to duct cryogenic vapour from said turbulence inducing fan to the space above said conveyor comprises a duct defined between said intake cowl and an internal wall of said elongate tunnel.

If desired the cryogenic vapour may be conducted to the space above the conveyor via a single duct to one side of the conveyor. In this case, the upper part of the elongate tunnel is preferably shaped to enhance the formation of the required vortex. For this purpose the top of the elongate tunnel may be arcuate. However, it is more preferred to provide an arrangement inducing means to direct cryogenic vapour from said turbulence inducing fan to the space above said conveyor comprising two ducts each of which is disposed on a respective side of said elongate tunnel and is defined between said intake cowl and an internal wall of said elongate tunnel.

Preferably, an internal wall of said elongate tunnel opposite said turbulence inducing fan is provided with a baffle to promote the formation of two counter rotating vortices. The baffle may conveniently take, in cross-section, the form of a cusp.

Preferably, said turbulence inducing fan is mounted on a shaft which extends through the wall of said elongate tunnel and is rotatable by a motor.

Advantageously, said elongate tunnel is provided with a multiplicity of turbulence inducing fans which may optionally be driven by a common motor.

Preferably, at least one deflector is provided to direct cold gas into said duct. Advantageously, said deflector comprises a pair of generally triangular diverter plates which are joined adjacent the base of said turbulence inducing fan and extend towards said intake cowl.

Advantageously, the diverter plates are positioned so that, in use, substantially equal volumes of cryogenic vapour are deflected to either side of said elongate tunnel.

Preferably, said diverter plates are inclined towards said intake cowl and away from said turbulence inducing fan.

Advantageously, said diverter plates are joined by a filler plate and the inside of said deflector is optionally filled with insulation.

Preferably, the interior of said elongate tunnel has, in cross-section, eight sides comprising a bottom, a first inclined surface sloping upwards from one edge of said bottom, a second inclined surface sloping upwardly from the other edge of said bottom, a first side wall extending upwardly from said first inclined surface, a second side wall extending upwardly from said second inclined surface, a third inclined surface extending from said first side wall to one edge of a top and a fourth inclined surface extending from said second side wall to the other edge of said top.

Advantageously, an upper portion of said freezer tunnel comprising said first side wall, said second side wall, said top and said third and fourth inclined surfaces can be raised relative to the remainder of said elongate tunnel to facilitate access to said conveyor.

For a better understanding of the present invention reference will now be made, by way of example, to the accompanying drawings, in which:

BRIEF DESCRIPTION OF THE DRAWINGS

FIG. 5 is a longitudinal section of the module between the lines V—V of FIG. 3; and FIG. 6 is a top plan view of a modified arrangement for directing cryogenic fluid from the turbulence inducing fans to the ducts.

DETAILED DESCRIPTION OF THE PREFERRED EMBODIMENTS

Figure 1:
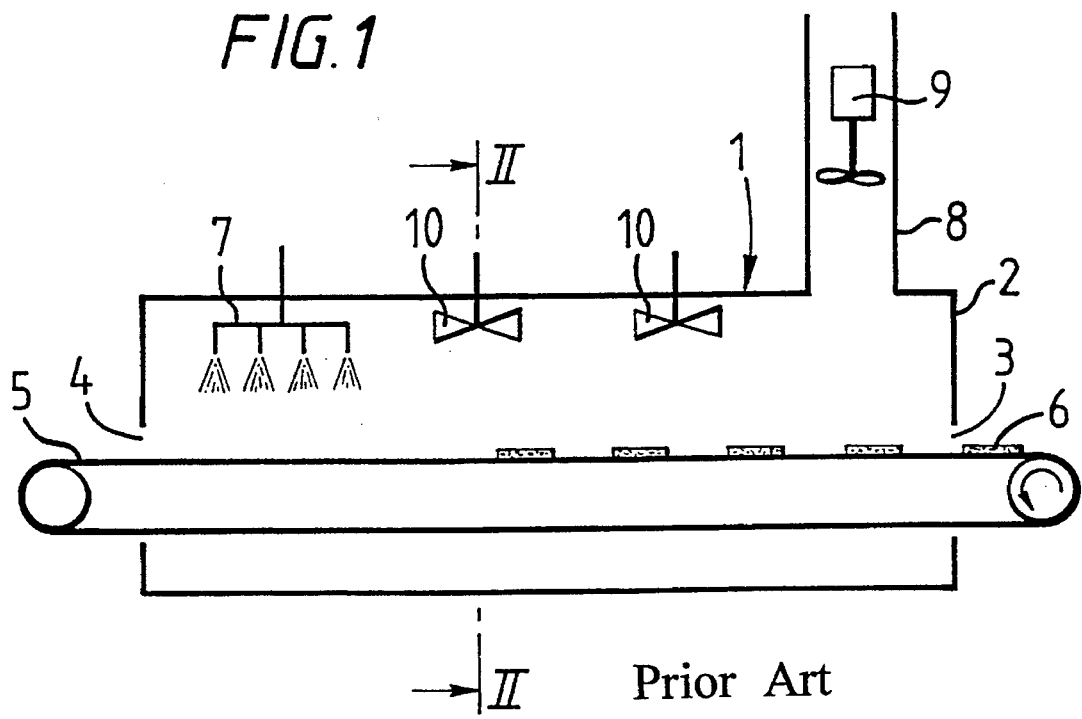
FIG. 1 is a schematic longitudinal cross-section through a known tunnel freezer.
Figure 2:
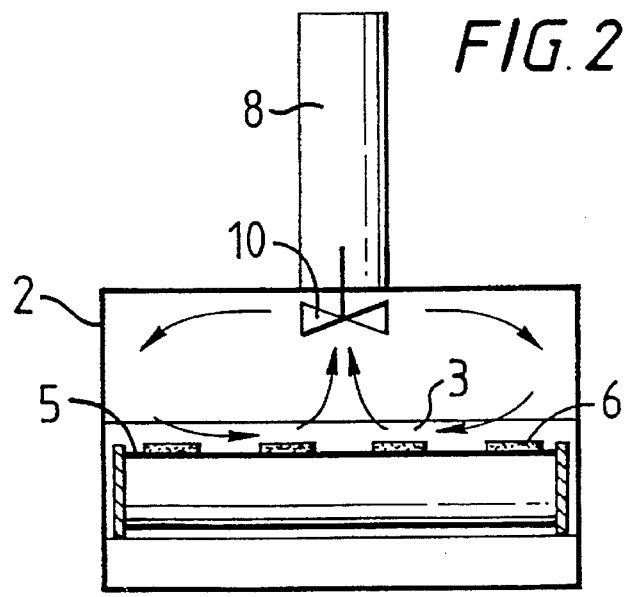
FIG. 2 is a view taken on line II—II of FIG. 1.

Referring to FIGS. 1 and 2 of the drawings, there is shown a conventional tunnel freezer which is generally identified by the reference numeral 1. The tunnel freezer 1 comprises an elongate tunnel 2 having a product inlet 3 and a product outlet 4. A conveyor 5 extends through the elongate tunnel 2. In use, product to be frozen, for example hamburgers 6, are placed on the conveyor 5 and are then cooled by cold nitrogen which enters the elongate tunnel 2 through spray bar 7 and then passes through the elongate tunnel 2 to the exhaust duct 8 which is provided with an extractor fan 9 which removes the nitrogen at approximately the same rate at which it is introduced into the elongate tunnel 2 so that little or no nitrogen enters the working environment via product inlet 3 and product outlet 4.

The rate of heat transfer in the vicinity of the spray bar 7 is about 120 w/m$^2$/° K. Turbulence inducing fans 10 are provided in the roof of the elongate tunnel 2 between the spray bar 7 and the exhaust duct 8 to enhance heat transfer in this area. In the applicants' present tunnel freezers the rate of heat transfer in this area is about 40 w/m$^2$/° K.

As can be seen from FIG. 2, the turbulence inducing fans 10 essentially suck the heavy cryogenic vapour upwardly from the top of the conveyor 5 and circulate it as shown. When the conveyor 5 is heavily laden there is negligible flow downwardly through the conveyor 5 or around the small gap between the edges of the conveyor 5 and the wall of the elongate tunnel 2.

Figure 3:
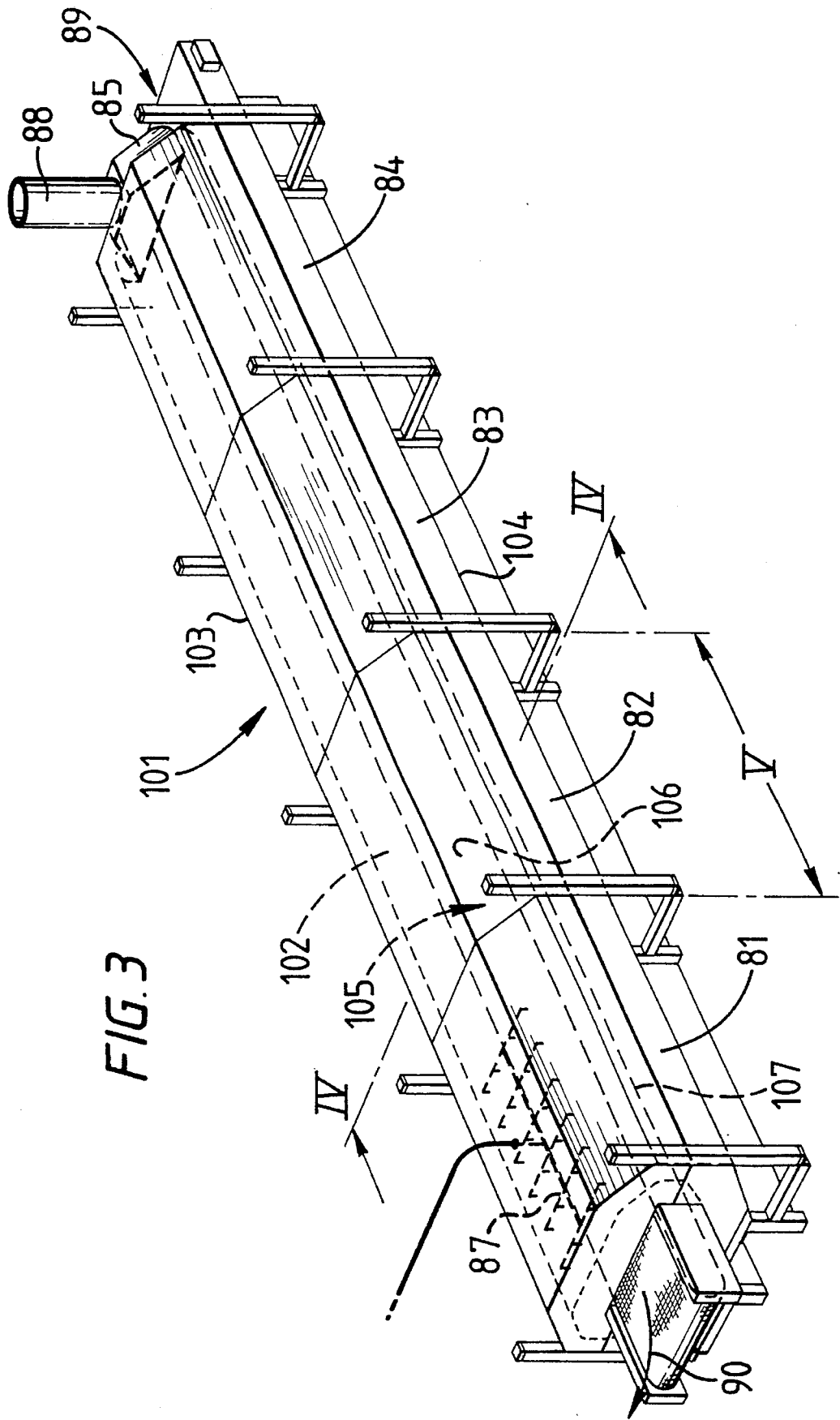
FIG. 3 is a side elevation, with parts cut-away, of one embodiment of a tunnel freezer in accordance with the invention.

Referring now to FIG. 3 there is shown a tunnel freezer in accordance with the invention. The tunnel freezer, which is generally identified by reference numeral 101, comprises five modules which are identified by reference numerals 81, 82, 83, 84 and 85.

The modules 81, 82, 83, 84 and 85 together define an elongate tunnel 102 having a product inlet 89 and a product outlet 90.

The elongate tunnel 102 comprises an upper portion 103 and a lower portion 104. A conveyor 105 having an upper reach 106 and a lower (return) reach 107 is mounted in the elongate tunnel 102 and is supported by beams 108 and 109 (FIG. 4) forming part of a fixed support frame.

Module 81 is provided with a spray bar 87 which is similar to the spray bar 7 shown in FIG. 1. Module 85 is provided with an exhaust duct 88 which is similar to the exhaust duct 8 shown in FIG. 1. Modules 82, 83 and 84 are identical to one another and replace the arrangement between the spray bar 7 and the exhaust duct 8 shown in FIGS. 1 and 2.

Module 82 will now be described in detail. As can be seen from FIGS. 3 and 4, an intake cowl 110 is disposed beneath the conveyor 105 and extends beyond either edge thereof.

Two turbulence inducing fans 111 are mounted in the lower portion 104 of the module 82 with their inlets adjacent respective circular openings in the intake cowl 110.

The intake cowl 110, the wall of the lower portion 104 of the elongate tunnel 102 and part of the wall of the upper portion 102 of the elongate tunnel 102 together define a duct 112 which, in use, conveys cold cryogenic fluid from the turbulence inducing fans 111 to the top of the upper portion 103 and to a cusp-shaped deflector 113.

In use, cold nitrogen vapour from module 81 is sucked through the intake cowl 110 into the inlets of the turbulence inducing fans 111. The cold nitrogen vapour is then blown upwardly through the ducts 112 to the top of the elongate tunnel 102 where they are deflected downwardly by the cusp-shaped deflector 113.

The conveyor 105 is of relatively fine mesh so that the cold nitrogen vapour forms two counter-rotating vortices which rotate about respective axis which extend generally parallel to the longitudinal axis of the elongate tunnel and which rapidly cool the product on the conveyor 105. Although a small quantity of cold nitrogen vapour passes through the conveyor 108 the majority enters the intake cowl 110 via inlets 114 and 115.

In a full size test apparatus the heat transfer recorded was 100 w/m$^2$/° K., a more than 100% increase over the equivalent area in applicants' own previous tunnel freezers.

Each turbulence inducing fan 111 is rotatably mounted on a shaft 116 which passes through the lower portion 104 and is provided with a drive wheel 117. Each turbulence inducing fan 111 in the module 82 is driven by a common motor 128 as shown in FIG. 4.

Figure 4:
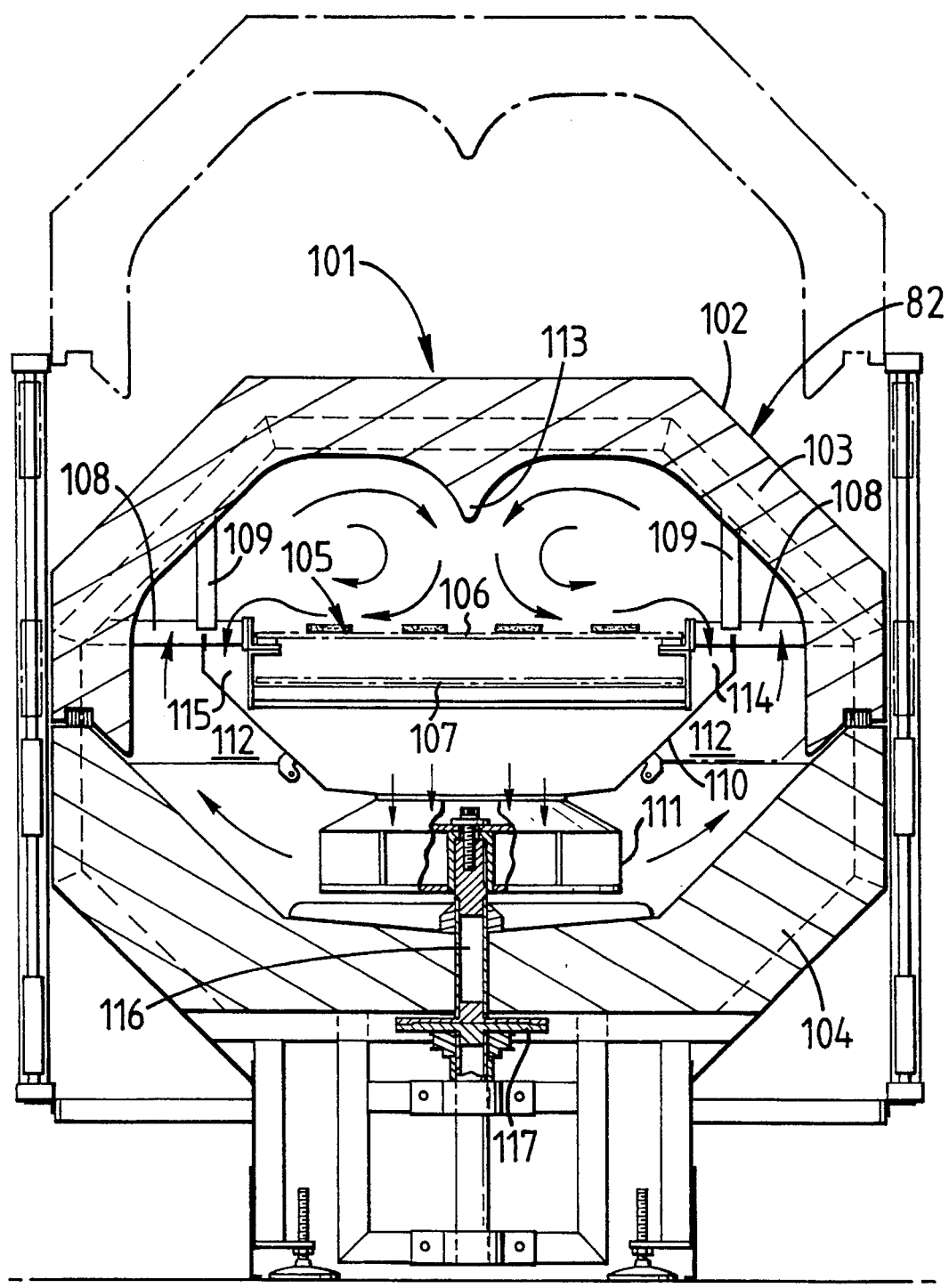
FIG. 4 is a view taken on line IV—IV of FIG. 3.

In the arrangement shown in FIGS. 4 and 5 the turbulence inducing fans 111 eject cold nitrogen substantially uniformly around the peripheries thereof. It will be appreciated that this is inefficient in that the cold nitrogen should be blown through ducts 112 and any excess cold nitrogen being blown along the elongate tunnel 102 is essentially a waste of energy.

In order to reduce this wastage of energy deflectors are preferably provided to divert cold nitrogen flowing along the elongate tunnel into the ducts 112.

As shown in FIG. 6, a deflector 118 is disposed to either side of each turbulence inducing fan 111. Each deflector comprises two diverter plates 119 and 120 which are generally triangular and which meet at point 121 on the bottom of the tunnel freezer 101. Each diverter plate 119, 120 extends upwardly from the bottom of the elongate tunnel 102 towards the intake cowl and is inclined away from its respective turbulence inducing fan 111 as shown. A filler plate 122, which is also generally triangular, is welded to the upper edges of diverter plates 119 and 120 and extends to the underside of the intake cowl (not shown). The interior of the deflectors 118 is fitted with an insulating material.

In use, cold nitrogen travelling generally along the elongate tunnel 102 is diverted toward the ducts 112 at the sides of the tunnel freezer 101. In this connection it will be noted that the tips 121 are offset from the longitudinal axis of the elongate tunnel 102 towards the direction of rotation of the turbulence inducing fans 111. The offset is designed to help ensure that substantially equal volumes of gas pass through the ducts 112 to either side of the turbulence inducing fans 111.

It should be noted from FIG. 4 that the cusp-shaped deflector 113 causes the nitrogen vapour to form two counter-rotating vortices above the upper reach 106 of the conveyor 105 and it is believed that these vortices are responsible for a substantial portion (but not all) of the improved heat transfer obtained.

Various modifications to the arrangement described are envisaged, for example one or more small gas transfer fans could be provided to blow cold nitrogen vapour towards the exhaust duct if desired.

What is claimed is:

1. A tunnel freezer comprising an elongate tunnel, a conveyor extending through said elongate tunnel, and at least one turbulence inducing fan for bringing cryogenic vapour into contact with product to be frozen when said tunnel freezer is in use, wherein said turbulence inducing fan is disposed beneath said conveyor and is provided with an intake cowl which is positioned below said conveyor to facilitate the passage of cryogenic vapour from said conveyor to the intake of said turbulence inducing fan, means to duct cryogenic vapour from said turbulence inducing fan to the space above said conveyor, and means to promote the formation in said space of at least one vortex which will rotate about an axis which is generally parallel to the axis of said elongate tunnel.

2. A tunnel freezer as claimed in claim 1, wherein the intake cowl extends beyond either edge of the conveyor.

3. A tunnel freezer as claimed in claim 1, wherein said means to duct cryogenic vapour from said turbulence inducing fan to the space above said conveyor comprises a duct defined between said intake cowl and an internal wall of said elongate tunnel.

4. A tunnel freezer as claimed in claim 3, wherein said means to direct cryogenic vapour from said turbulence inducing fan to the space above said conveyor comprises two ducts each of which is disposed on a respective side of said elongate tunnel and is defined between said intake cowl and an internal wall of said elongate tunnel.

5. A tunnel freezer as claimed in claim 4, wherein an internal wall of said elongate tunnel opposite said turbulence inducing fan is provided with a baffle to promote the formation of two counter rotating vortices.

6. A tunnel freezer as claimed in claim 5, wherein said baffle takes, in cross-section, the form of a cusp.

7. A tunnel freezer as claimed in claim 1, wherein said turbulence inducing fan is mounted on a shaft which extends through the wall of said elongate tunnel and is rotatable by a motor.

8. A tunnel freezer as claimed in claim 7, including a multiplicity of turbulence inducing fans rotatable by said motor.

9. A tunnel freezer as claimed in claim 1, including at least one deflector to direct cold gas into said duct.

10. A tunnel freezer as claimed in claim 9, wherein said deflector comprises a pair of generally triangular diverter plates which are joined adjacent the base of said turbulence inducing fan and extend towards said intake cowl.

11. A tunnel freezer as claimed in claim 10, wherein said diverter plates are positioned so that, in use, substantially equal volumes of cryogenic vapour are deflected to either side of said elongate tunnel.

12. A tunnel freezer as claimed in claim 10, wherein said diverter plates are inclined towards said intake cowl and away from said turbulence inducing fan.

13. A tunnel freezer as claimed in claim 10, wherein said diverter plates are joined by a filler plate and the inside of said deflector is filled with insulation.

14. A tunnel freezer as claimed in claim 1, wherein the interior of said elongate tunnel has, in cross-section, eight sides comprising a bottom, a first inclined surface sloping upwardly from one edge of said bottom, a second inclined surface sloping upwardly from the other edge of said bottom, a first side wall extending upwardly from the other edge of said bottom, a first side wall extending upwardly from said first inclined surface, a second side wall extending upwardly from from said second inclined surface, a third inclined surface extending from said first side wall to one edge of a top, and a fourth inclined surface extending from said second side wall to the other edge of said top.

15. A tunnel freezer as claimed in claim 14, wherein an upper portion of said freezing tunnel comprising said first side wall, said second side wall, said top and said third and fourth inclined surfaces can be raised relative to the remainder of said elongate tunnel to facilitate access to said conveyor.

16. A tunnel freezer comprising an elongate tunnel, a conveyor extending through said elongate tunnel, and at least one turbulence inducing fan for bringing cryogenic vapour into contact with product to be frozen when said tunnel freezer is in use, wherein said turbulence inducing fan is disposed beneath said conveyor and is provided with an intake cowl which extends beyond either edge of the conveyor and is positioned below said conveyor to facilitate the passage of cryogenic vapour from said conveyor to the intake of said turbulence inducing fan, means to duct cryogenic vapour from said turbulence inducing fan to the space above said conveyor, said means comprising two ducts each of which is disposed on a respective side of said elongate tunnel and is defined between said intake cowl and an internal wall of said elongate tunnel, and means to promote the formation in said space of at least one vortex which will rotate about an axis which is generally parallel to the axis of said elongate tunnel.

17. A tunnel freezer as claimed in claim 16, wherein an internal wall of said elongate tunnel opposite said turbulence inducing fan is provided with a baffle to promote the formation of two counter rotating vortices.

18. A tunnel freezer as claimed in claim 17, wherein said baffle takes, in cross-section, the form of a cusp.

19. A tunnel freezer as claimed in claim 18, wherein said turbulence inducing fan is mounted on a shaft which extends through the wall of said elongate tunnel and is rotatable by a motor.

20. A tunnel freezer as claimed in claim 19, including a multiplicity of turbulence inducing fans rotatable by said motor.

21. A tunnel freezer as claimed in claim 16, including at least one deflector to direct cold gas into said duct.

22. A tunnel freezer as claimed in claim 21, wherein said deflector comprises a pair of generally triangular diverter plates which are joined adjacent the base of said turbulence inducing fan and extend towards said intake cowl.

23. A tunnel freezer as claimed in claim 22, wherein said diverter plates are positioned so that, in use, substantially equal volumes of cryogenic vapour are deflected to either side of said elongate tunnel.

24. A tunnel freezer as claimed in claim 22, wherein said diverter plates are inclined towards said intake cowl and away from said turbulence inducing fan.

25. A tunnel freezer as claimed in claim 22, wherein said diverter plates are joined by a filler plate and the inside of said deflector is filled with insulation.

26. A tunnel freezer as claimed in claim 22, wherein the interior of said elongate tunnel has, in cross-section, eight sides comprising a bottom, a first inclined surface sloping upwardly from one edge of said bottom, a second inclined surface sloping upwardly from the other edge of said bottom, a first side wall extending upwardly from the other edge of said bottom, a first side wall extending upwardly from said first inclined surface, a second side wall extending upwardly from said second inclined surface, a third inclined surface extending from said first side wall to one edge of a top, and a fourth inclined surface extending from said second side wall to the other edge of said top.

27. A tunnel freezer as claimed in claim 26, wherein an upper portion of said freezing tunnel comprising said first side wall, said second side wall, said top and said third and fourth inclined surfaces can be raised relative to the remainder of said elongate tunnel to facilitate access to said conveyor.

* * * * *